United States Patent [19]

Altenburger et al.

[11] 4,041,253
[45] Aug. 9, 1977

[54] BUS MONITOR CIRCUIT FOR DETECTING MALFUNCTION OF TELEPHONE CIRCUITS CONNECTED IN GROUPS TO A COMMON BUS

[75] Inventors: Otto Altenburger, Rochester; Alton E. Dorazio, Rochester, both of N.Y.

[73] Assignee: Stromberg-Carlson Corporation, Rochester, N.Y.

[21] Appl. No.: 625,003

[22] Filed: Oct. 23, 1975

[51] Int. Cl.² .............................................. H04M 3/22
[52] U.S. Cl. ............................................. 179/175.2 R
[58] Field of Search ............... 179/175.2 R, 175.2 C, 179/175.25

[56] References Cited

U.S. PATENT DOCUMENTS

| | | | |
|---|---|---|---|
| 3,400,228 | 9/1968 | Bubber | 179/175.2 R |
| 3,626,383 | 12/1971 | Oswald | 179/175.2 R |
| 3,851,311 | 11/1974 | Mila | 179/175.2 C |

*Primary Examiner*—Douglas W. Olms
*Attorney, Agent, or Firm*—William F. Porter, Jr.; Donald R. Antonelli

[57] ABSTRACT

A respective bus monitor circuit is connected to each group of a plurality of circuits selectively connectable to one end of a multi-conductor bus which extends to a common control circuit. When the function to be performed by the common control circuit is not completed within a preset time, all bus monitor circuits are signalled to check the group of circuits to which they are individually connected to locate a possible malfunction therein and automatically disable that group to prevent lock-up of the system if the malfunction is detected.

12 Claims, 3 Drawing Figures

BUS MONITOR CIRCUIT FOR DETECTING MALFUNCTION OF TELEPHONE CIRCUITS CONNECTED IN GROUPS TO A COMMON BUS

The present invention relates in general to automatic telephone systems, and more particularly to a novel bus monitor circuit for detecting faulty relay operations in circuits associated with common control equipment in the system and for effecting disconnection of such circuits to prevent lock-up of the common control equipment.

In telephone circuits which include one or more relays provided for purposes of controlling connection of the circuit to common equipment within the system, malfunction of a relay frequently will not only affect the operation of that circuit, but often will have an overriding effect on the overall system operation and may result in a complete disabling or lock-up of the system by inhibiting the common control. Since such total breakdown of the telephone system cannot be tolerated under any circumstances, it is extremely important that some means be provided to make it possible to quickly locate such faults, and/or to automatically disconnect or disable the malfunctioning circuit so as to permit the system to continue operation even if at reduced efficiency. However, where the circuit which contains the malfunctioning relay is one of many circuits connected to common control equipment via a bus system, it is extremely difficult to quickly locate and replace or disconnect the malfunctioning circuit.

Certain common control circuits in present day telephone systems perform functions only in conjunction with a single call at a time, and therefore, the telephone system will include only a single one of these circuits, which then will be made available on a sucessive time shared basis for each call as it is generated or received in the system. One such circuit in a common control system is the junctor control, which serves to control the many junctors and ringing control circuits within the system for purposes of effecting termination of all local and outgoing trunk calls.

Since common control circuits, such as the junctor control, cannot function to establish more than one call at a time, for reasons of economy and system simplicity it has been the common practice to connect such a common control circuit to the other circuits in the system with which it is designed to operate by way of a bus line. Thus, the junctor control is often connected to one end of a bus which is associated in common with all of the junctors in the system, and the connection between the junctor control and the many ringing control circuits in the system is effected in a similar way.

As each call is processed within the system, the selected junctor and ringing control will connect itself to the junctor control via a respective common bus shared by similar circuit. Termination of a call will involve only a single junctor and ringing control at a time, and therefore, so long as all of the relays of the junctor and ringing control which serve to connect and release these circuits from respective buses to the junctor control operate properly, the junctor control will be constantly available for successive junctor control calls processed by the system. However, when a junctor or ringing control fails to release the junctor control due to a malfunctioning relay therein, a lock-up of the system occurs. In presently known systems such a malfunction can be located only by the time consuming individual checking of each junctor and ringing control in the system. Thus, in view of the large number of such circuits provided in a typical central office, the down time of the system will be intolerable.

It is therefore an object of the present invention to provide a bus monitor circuit for a common control telephone system which is capable of quickly detecting a malfunctioning circuit which may be connected to common control equipment via a multi-conductor bus.

It is another object of the present invention to provide, by simple and economical means, a monitor circuit for monitoring groups of circuits associated with common control equipment via a common bus and automatically disabling a selected group of such circuits which are found to include a malfunctioning circuit.

A further object of the present invention is to provide a monitor circuit for automatic common control telephone equipment which is capable of automatically disabling circuits within the system which are capable, as a result of their association with common control equipment, of totally disabling the telephone system when one or more elements thereof operate improperly.

In accordance with the present invention, the bus monitor circuit is provided for monitoring the electrical state of the conductors connecting a plurality of circuits in common to one end of a bus line extending to the common control within the system. Thus, in a system in which groups of junctors are associated via a bus line with the junctor control, a bus monitor circuit is provided in association with the outputs of each group of junctors to monitor the state of these outputs to the bus line and determine, in response to indication from the junctor control, whether any one of the junctors of the group with which it is associated is malfunctioning.

When the system indicates to the junctor that it is ready for termination of a call within the system, the junctor will request service from the junctor control and acquire the junctor control through setting of various relays therein, connecting its outputs to the common bus extending to the junctor control. When the terminating connection has been completed, the junctor control will signal the junctor, which then should release the junctor control by releasing the relays which serve to connect the outputs of that local junctor to the common bus to the junctor control. However, if one or more of the relays receiving the indication from the junctor control that termination has been completed fails to operate, or if the relays which connect the outputs of the junctor to the junctor control fail to release, the junctor control will be permanently connected to that junctor, and therefore, will be unavailable for use in connection with other terminating operations. The result is that the system will lock up so that no further calls can be serviced.

The bus monitor circuit of the present invention serves to monitor the output leads from each group of junctors which are connected in common to the bus line to the junctor control. When the jucnctor control fails to complete its operation within a prescribed time, the time-out within the junctor control will signal the bus monitors associated with each of the groups of junctors to check the outputs of the junctor groups for the presence of persistent ground signal which would indicate failure of a relay within one of the junctor circuits of the group. Detection of a persistent ground by one of the bus monitors effects automatic disconnection of that group of junctors from the system thereby immediately freeing the junctor control for use in connection with the remaining groups of junctor circuits.

The bus monitor circuit of the present invention is also used to monitor the outputs of the ringing control circuits of the system which are also connected to the junctor control via a common bus. The junctor control passes on to the ringing control circuits information concerning the subscriber ringing code, and busy override condition, if required, of the terminating line circuit. The ringing control circuits operate to associate themselves with the junctor control in basically the same manner as the junctor circuits themselves so that malfunction of a relay or relays in the ringing control circuit can result in permanent connection of the junctor control to a particular ringing control circuit, thereby locking up the junctor control and totally disabling the system.

These and other objects, features, and advantages of the present invention will become more apparent from the following detailed description of the invention, when taken in conjunction with the accompanying drawings, which illustrate one example of the present invention and wherein.

GENERAL SYSTEM DESCRIPTION

Figure 1:
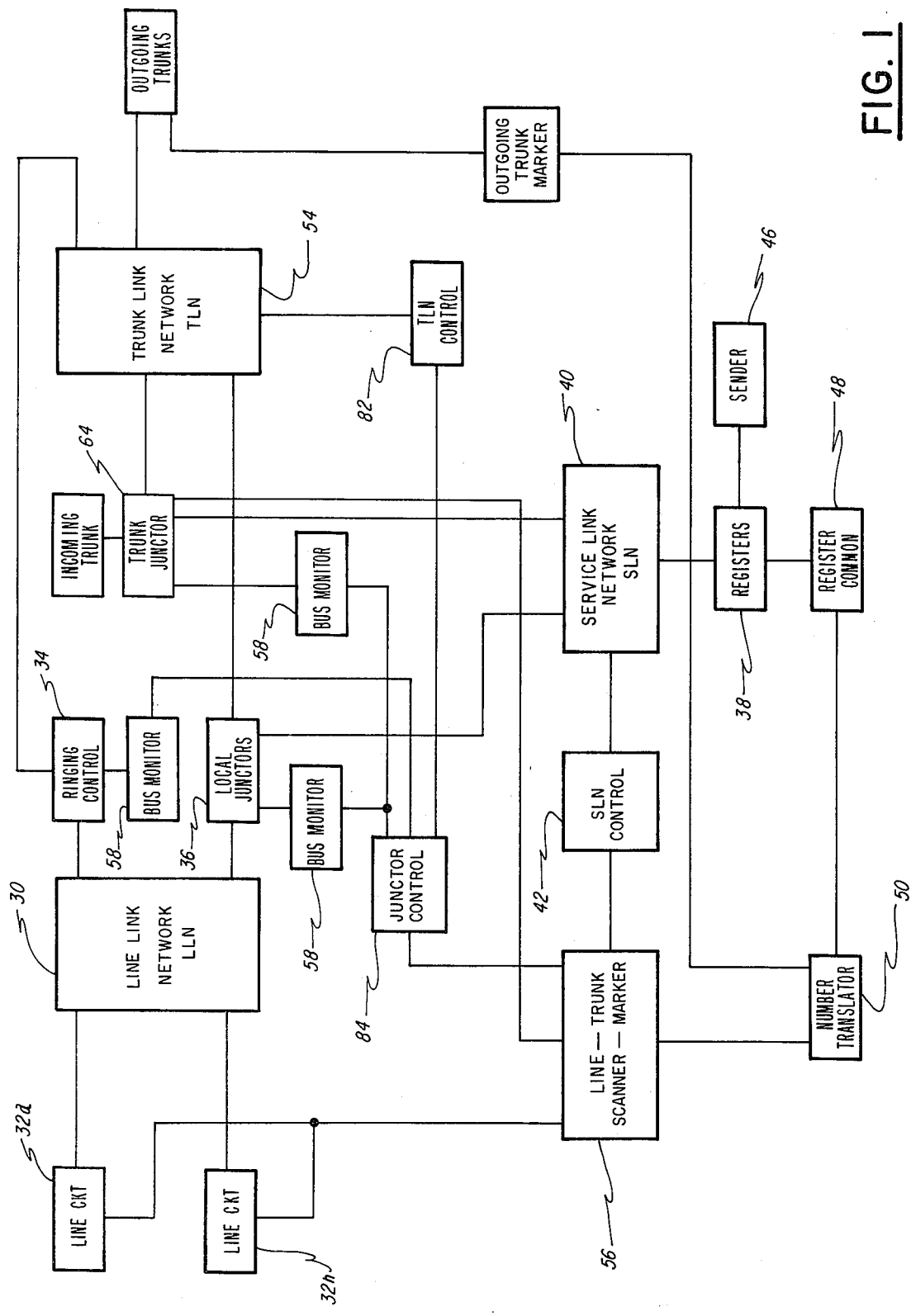
FIG. 1 is a schematic block diagram of an electronic telephone system within which is incorporated the features of the present invention.

FIG. 1 of the drawing illustrates a basic block diagram of a telephone system including a plurality of line circuits 32a through 32n connected to a multistage line link network (LLN) 30, the final stage of which provides terminations to the local junctors 36 in the case of originating traffic and to the ringing controls 34 for terminating traffic. The number of local junctors and ringing controls provided depends upon the traffic requirements for the system. A large system having 10,000 lines may typically comprise 1,200 each of junctors and ringing control circuits.

The local junctors 36, which may be of the type disclosed in the U.S. Pat. No. 3,705,268 to Otto Altenburger, include provisions for connecting the line circuits to local registers 38 through a service link network 40 under the control of a service link network control 42. The registers 38, which serve to detect dialing information and other subscriber signals from the line circuits, basically consist of a dial pulse acceptor, register storage, and register output and can be connected to a sender 46 for providing outpulsing in connection with outgoing trunk calls. The registers 38 and senders 46 are controlled by a register common 48, which is in turn connected to a number-code translator 50 providing information concerning equipment numbers, ringing codes, and class of service information.

The line-trunk scanner-marker 56, which is disclosed in copending application Ser. No. 625,057, filed Oct. 23, 1975, in the name of Otto Altenburger, assigned to the same assignee as the present application, is used for both originating and terminating types of functions. When the circuit 56, which continuously scans the line circuits 32a through 32n, detects a service request in the form of an off-hook condition, it marks the line requesting service and actuates the service link network control 42 to start the path finding from an available register 38 to the marked line circuit. The service link network control 42 seeks out a path from the register 38 through the service link network 40, a local junctor 36, and the link network 30 to the marked line circuit. Dial tone is then applied to the line circuit from the register 38, notifying the subscriber that he may commence dialing the line number of the called party.

The dialed information is received from the calling subscriber line in the register 38, which determines from the translator 50 whether the call is to be a local call or a truck call. In the case of a local call, the number of the called party is translated to an equipment number in the translator 50 and the circuit 56 marked the called line in accordance with the equipment number received from the translator 50. At this time, a switch-through signal is forwarded from the local register 38 through the local junctor 36 signalling the junctor to seize the junctor control 84 to effect termination of the call to the marked called line circuit.

Since the system can terminate only a single call at a time, only one junctor control 84 is provided in the system. Thus, all of the local junctors 36, trunk junctors 64, and the ringing controls 34 are selectively connected to the single junctor control 84 via respective bus lines and these circuits selectively seize the junctor control 84 when termination of a call is required. Under the circumstances, it can be appreciated that failure of a local junctor 36, trunk junctor 64, or ringing control 34 to release the junctor control 84 when termination of a call has been completed, will effectively disable the junctor control and prevent proper processing of further calls in the system.

In terminating a call within the system, the junctor control 84 actuates the trunk line network control 82 to start the path finding operation through the trunk line network 54 from the local junctor 36 to the marked terminating line circuit. The ringing code for the called subscriber is forwarded from the translator 50 through the scanner-marker circuit 56 and the junctor control 84 to the ringing control 34. As soon as the junctor control 84 determines that the connection from the junctor 36 through the trunk line network 54, ringing control 34 and line link network 30 the line circuit has been completed, it will signal the local junctor via the common bus preparing the local junctor for switch-through between the parties, the junctor should then release the junctor control in response to this signal. However, if the control relay in the junctor which is responsive to this signal from the junctor control fails to operate, the junctor control 84 will remain permanently associated with that junctor.

The present invention is directed to a bus monitor circuit 58 which is connected between groups of local junctors 36, trunk junctors 64, and ringing controls 34 and the common bus lines from these circuits to the junctor control 84. These bus monitor circuits 58 sample the outputs of the group of circuits to which they are connected to detect a persistent ground indicating a locked-up condition between one of these circuits and the junctor control. Upon detection of such a condition, the bus monitor circuits immediately disables all of the circuits of the group to which it is connected thereby freeing the junctor control for use in terminating calls through the other junctor circuits and ringing controls which remain available in the system.

PREFERRED EMBODIMENT OF THE INVENTION

Figure 2:
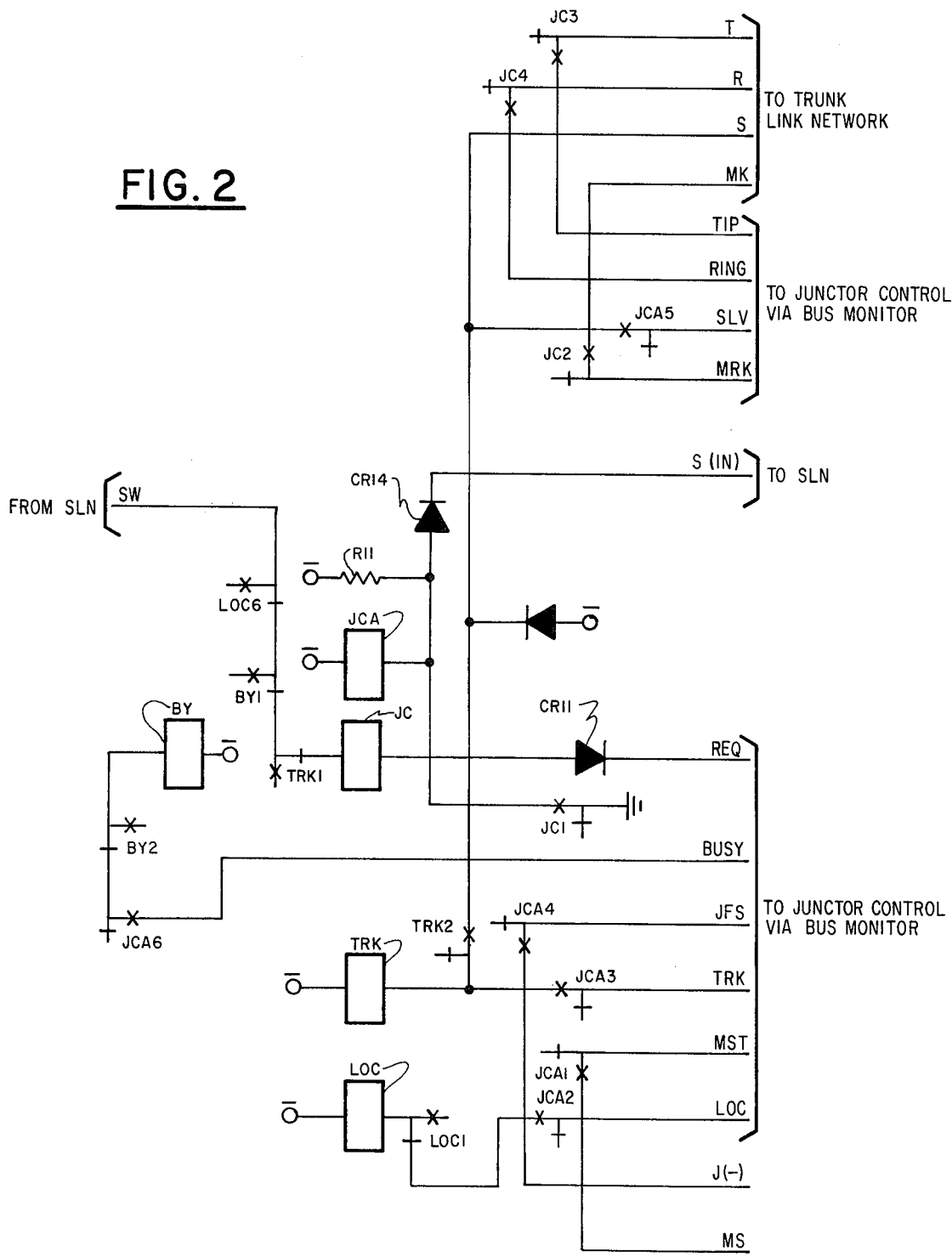
FIG. 2 is a schematic circuit diagram of a portion of a junctor circuit.

FIG. 2 illustrates a portion of the junctor circuit disclosed in the aforementioned U.S. Pat. No. 3,705,268, and more particularly the portion thereof which directly controls connection and release of the junctor to the common bus extending to the junctor control. This junctor circuit is designed so that the incoming lines from the line link network or trunk circuit to the junctor are normally connected within the junctor to the service link network so that no particular operation of control relays in the junctor is necessary during the initial connection of a line circuit or incoming trunk circuit through the service link network to a register, which is the basic originating connection for all calls. Thus, the junctor control and control relay portion of the junctor are necessary only during the terminating portions of the communication connection.

After dialing has been completed and all dialing signals have been received by the local register, ground will be extended from the local register through the service link network on the switch-through lead SW which, as seen in FIG. 2, passes through the normally closed contacts LOC6, BY1, and TRK1 of the local relay LOC, busy relay BY and trunk relay TRK, respectively, to the junctor relay JC which is energized by the negative potential applied to the line REQ from the junctor control via diode CR11. The ground signal which extends from the register on the lead SW is a switch-through signal which not only operates the junctor relay JC, but also acquires the junctor control by energizing a request relay in the junctor control to initiate operation of that common control circuit to begin the terminating operation to the marked called line circuit. Upon operation of the junctor relay JC, the junctor assist relay JCA is also operated through the closed contacts JC1 of the junctor relay.

The operation of the junctor relay JC additionally connects the mark lead MRK from the junctor control to the mark lead MK extending to the trunk link network via contacts JC2, and connects the tip and ring leads TIP and RNG from the junctor control to the tip and ring leads T and R, extending to the trunk link network via contacts JC3 and JC4. Operation of the junctor assist relay JCA connects ground on lead MST from the junctor control through contacts JCA1 to the lead MS extending to the trunk link network matrix selector to start the trunk link network control 82 in its path finding operation. The connections between the junctor control and the junctor are via a common bus shared by all junctors.

The closing of contacts JCA2 and JCA3 also enable connection of a signal indication on leads LOC and TRK from the junctor control to the local relay LOC and the trunk relay TRK to enable the junctor control to operate one or the other of these relays indicating whether the call is to be a local call or trunk call. The closing of the contacts JCA4 also extends ground from the line marker or outgoing trunk marker through the junctor control on lead JSS to the lead J indicating the local or trunk junctor identity. The closing of contacts JCA6 also connects line BSY from the junctor control to the busy relay BY so that if an equipment busy or line busy condition exists, the junctor control can actuate the busy relay BY to connect busy tone back to the calling party.

Thus, it can be seen that receipt of the switch-through signal SW from the register effects a seizure of the junctor control by placing ground on the lead REQ, and also, through operation of the relays JC and JCA, effects connection of the junctor control to the junctor via the common bus and through the junctor to the trunk link network so that the path to the called line circuit can be monitored by the junctor control. So long as the junctor relay JC and junctor assist relay JCA remain operated, the junctor control will be seized by that particular junctor and will be unavailable for use in connection with other terminating operations. As seen in FIG. 2, three relays control the continued operation of the junctor relay JC and junctor assist relay JCA, namely, the local relay LOC, the trunk relay TRK, and the busy relay BY, all of which have contacts in the line to the junctor relay JC. Accordingly, the junctor control will not be released from the junctor unless one of these three relays is operated within the junctor.

If, during association of the junctor with the junctor control, while relays JC and JCA are operated, an equipment busy condition is detected, ground will be provided on the busy lead BSY from the junctor control through contacts JCA6 to operate the busy relay BY, and at the same time, ground is applied on lead TRK from the junctor control to operate the trunk relay TRK via closed contacts JCA3 of the junctor assist relay JCA. Operation of contacts BY1 opens the switch-through lead SW thereby releasing the relay JC, which in turn releases the relay JCA. At the same time ground is removed from the request lead REQ to the junctor control and the junctor releases the junctor control. Release of the junctor control is effected in a similar way once termination of the call to the called line circuit has been completed, as indicated by receipt of a signal LOC in connection with a local call or a signal TRK signifying a trunk call from the junctor control. Thus, either the local relay LOC or the trunk relay TRK will operate, each relay having contacts in the switch-through lead SW to effect release of the junctor relay JC.

If any one of the relays LOC, TRK, or BY are defective and refuse to operate when energized from the junctor control, release of the junctor control from the junctor will not be possible and the system will effectively lock up since the only junctor control in the system is permanently seized by a single junctor which is unable to complete its operation to release the common control circuit.

Similar problems occur with ringing control circuits and other circuits including relays which are connected in common via bus lines to common control equipment within the system. Where only a single common control circuit of a particular type is provided in the system, a refusal of a circuit to release this common equipment as a result of a malfunctioning relay can disable the entire system, preventing the establishment of any new calls through the system until the faulty circuit is detected. As in the case of junctor circuits, for large systems having as many as 1,800 junctors all associated in common to the single junctor control circuit, it is extremely difficult and time-consuming to detect the particular junctor circuit which is responsible for the locked-up condition of the system, since very often the only way to detect the faulty circuit is to check each one of the junctor circuits within the system individually until the malfunctioning circuit is found. However, to lose the system for the time necessary to undertake a circuit-bycircuit search of the system for the malfunctioning relay is absolutely not acceptable.

In accordance with the present invention, a bus monitor circuit is provided in association with groups of junctor circuits, ringing control circuits or similar circuits connected by a common bus to the junctor control or other common control circuit. The bus monitor circuits makes it possible to selectively sample the outputs from the group of junctor circuits or other circuits to the common bus to quickly detect which group of junctor circuits is providing the persistent ground signal to the junctor control and is receiving the persistent ground release signal from the junctor control. In this way, the group of junctor circuits including the junctor locked to the junctor control is quickly identified and a release signal can be immediately generated by the bus monitor detecting such a condition effecting immediate disconnection of the group of junctor circuits from the system thereby freeing the junctor control for seizure by one of the junctor circuits in the remaining groups of available junctor circuits.

Figure 3:
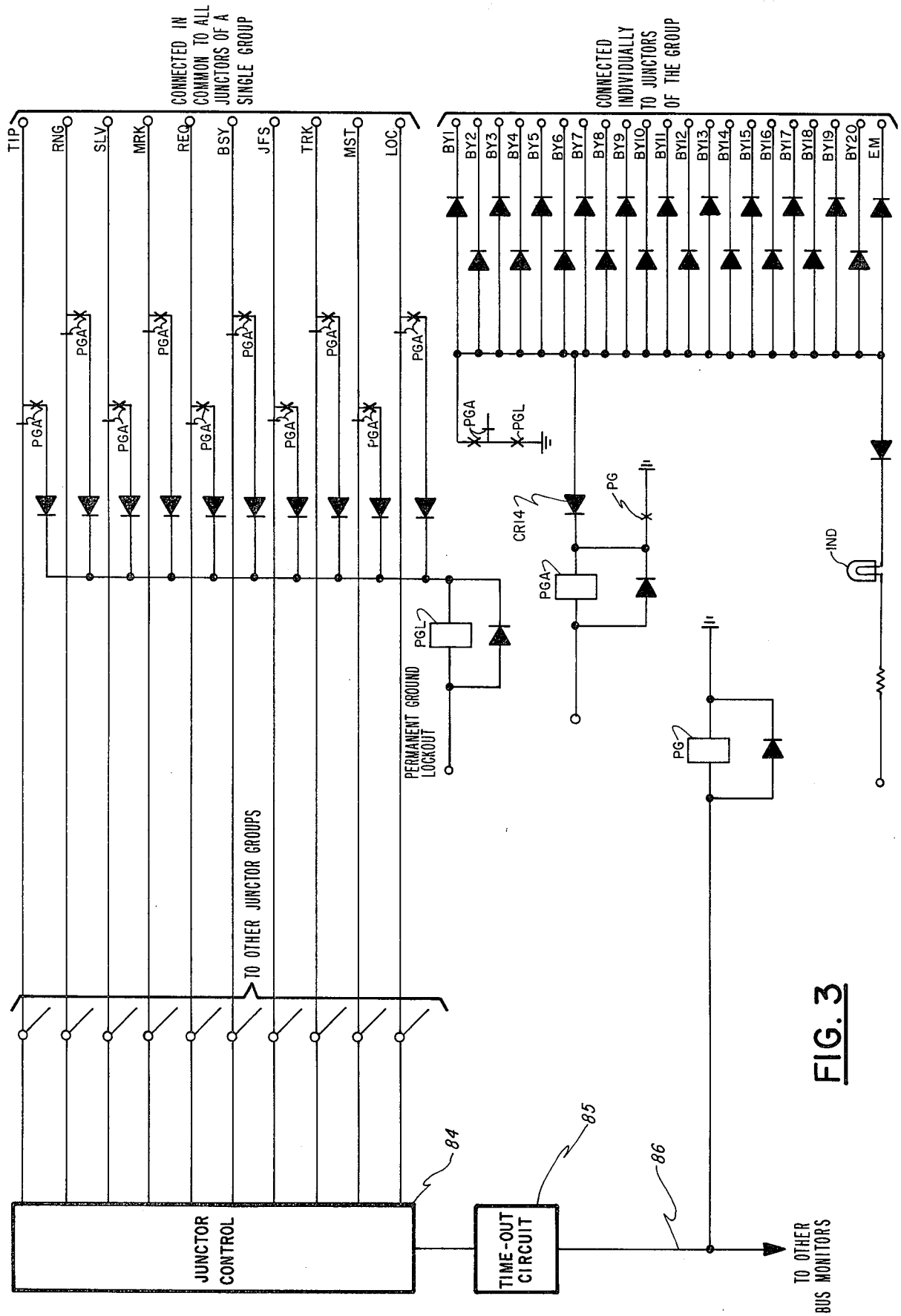
FIG. 3 is a schematic circuit diagram of the bus monitor circuit of the present invention.

FIG. 3 illustrates an exemplary embodiment of the bus monitor circuit in accordance with the present invention. By way of example, it is assumed that the junctor circuits in the system are grounded in lots of 20 junctors each with a bus monitor circuit being provided for each group of 20 junctors. All of the junctor groups are then selectively connected to the common bus which extends to the junctor control. Thus, as seen in FIG. 3, the junctor control 84 is connected by a 10 conductor bus line in common to the junctor terminals TIP, RNG, SLV, MRK, REQ, BSY, JFS, TRK, MST, and LOC.

Provided as part of the junctor control is a conventional time-out circuit 85 which may operate in response to initial seizure of the junctor control to initiate a time-out sequence to ensure that the junctor control will complete its terminating operations within a designated period of time. Such time-out circuits are conventionally provided in common control equipment to quickly indicate malfunctions to the system. A typical time-out circuit for the junctor control is disclosed in the aforementioned U.S. Pat. No. 3,705,268 in connection with false monitoring. Such time-out circuits serve to provide a signal when the system fails to perform a prescribed operation within a particular time.

In the circuit of FIG. 3, the time-out circuit 85 provides an output via line 86 to a relay PG in each bus monitor circuit when the junctor control fails to complete its terminating operations within a designated time. With operation of the relay PG in the bus monitor circuit, the relay PGA will operate between negative potential and ground through the contacts of relay PG thereby connecting each of the conductors extending to the bus line between the junctor control and the junctors of the particular junctor group to which the bus monitor is associated through a relay PGL to negative potential. Thus, if any of the terminals of the junctors of the group commonly connected to the bus extending to the junctor control is in a persistent ground condition, the permanent ground lock-out relay PGL will operate, connecting ground through the closed contact of that relay and the closed contacts of relay PGA in series therewith to each of the control lines BY1 through BY20 and also serves to provide a holding ground for the relay PGA, maintaining operation of this relay so long as the permanent ground lock-out relay PGL remains operated.

The leads BY1 through BY20 are connected individually to the junctors of the ground and serve to individually disconnect or disable the respective junctor circuit to which the individual lead is connected. In this way, all of the junctors of the particular group which are responsible for actuating the permanent ground lock-out relay PGL in the bus monitor associated therewith will be automatically disabled and disconnected from the system so that these junctors no longer will be capable of use in connection with originating service until the fault has been corrected. In this regard, it will be noted that upon operation of the relay PGA, the junctor control is immediately disconnected and becomes available for service in the system. However, even though the junctor group including the junctor responsible for the malfunction is disabled or disconnected from the system, so long as the junctor providing the persistent ground remains connected to the bus monitor, the permanent ground lock-out relay PGL will remain operated.

Ground which is applied through the contacts of the relays PGL and PGA also is applied, on the one hand, to an indicator lamp forming part of the bus monitor which provides a visual indication tht a malfunction has occurred. In addition, the ground is also applied on lead EM to an indicator located at the junctor group to identify the particular group of junctors in which the fault has been detected. Since the junctor circuits are typically provided on individual cards, detection of the particular junctor causing the malfunction simply requires a disconnection of each of the junctors of the junctor group in turn until the indicator light is extinguished, and then that particular junctor circuit can be immediately replaced. In the described example, with 20 junctors per junctor group, very little time is needed to detect the malfunctioning junctor circuit and replace it with one which will operate properly.

As soon as the malfunctioning junctor circuit is removed, the permanent ground lock-out relay PGL will immediately release removing ground from the leads BY1 through BY20 in the bus monitor thereby reactivating the junctor group. At the same time, holding ground is removed from the PGA relay, which then releases.

The foregoing description of the present invention has made reference to junctor circuits which are connected via a common bus to the junctor control of an automatic telephone system; however, as already suggested, the bus monitor circuit of the present invention is also capable of use with ringing control circuits and all other circuits which are provided in large numbers and connected via bus lines to common control equipment within the system. Thus, the description of the present invention in connection with junctor circuits and the junctor control in the telephone system is provided only by way of example to illustrate the general application of the present invention by way of a preferred embodiment of the invention.

While I have shown and described one embodiment in accordance with the present invention, it is understood that the same is not limited thereto but is susceptible of numerous changes, modifications and applications as known to a person skilled in the art, and I therefore do not wish to be limited to the details shown and described herein but intend to cover all such changes and modifications as are obvious to one of ordinary skill in the art.

What is claimed is:

1. In a telephone system including a plurality of first circuits each having a plurality of terminals selectively connectable to one end of a multi-conductor bus which is connected at the other end thereof to terminals of a second circuit having timing means for timing the operation thereof, a bus monitor circuit comprising detection means for detecting a predetermined electrical potential, connection means responsive to said timing means for connecting said detection means to each of said terminals of at least some of said first circuits when said second circuit fails to complete its operation in a predetermined time, and control means responsive to said detection means detecting said predetermined electrical potential for disabling the first circuits connected to said detection means.

2. A bus monitor circuit as defined in claim 1 wherein said control means includes indicator means for providing a visual indication so long as said detection means detects said predetermined electrical potential.

3. A bus monitor circuit as defined in claim 1 wherein said connection means is a relay circuit for selectively disconnecting said bus from said first circuits while connecting said detection means to the terminals thereof.

4. In a telephone system including a plurality of groups of first circuits connected in parallel to one end of a bus which is connected at the other end thereof to a common control circuit having timing means for timing the operation thereof and a bus monitor circuit connected to each group of first circuits, each bus monitor circuit comprising detection means for detecting a predetermined electrical potential, connection means normally connecting each first circuit of the group in common to said one end of said bus and being responsive to said timing means for switching said group of first circuits from said bus to said detection means when said common control circuit fails to complete its operation in a predetermined time, and control means responsive to said detection means detecting said predetermined electrical potential at the output of one of said first circuits for disabling all of the first circuits of the group.

5. A bus monitor circuit as defined in claim 4 wherein said control means includes indicator means for providing a visual indication so long as said detection means detects said predetermined electrical potential.

6. A bus monitor circuit as defined in claim 4 wherein said bus is a multi-conductor bus and said first circuits have a plurality of terminals connected by said connection means to the conductors of said bus.

7. A bus monitor circuit as defined in claim 6 wherein said detection means is a relay circuit selectively connected by said connection means in common to all of said terminals of said first circuits of the group.

8. A bus monitor circuit as defined in claim 7 wherein said common control circuit is a junctor control circuit and said first circuits are junctors.

9. A bus monitor circuit as defined in claim 7 wherein said common control circuit is a junctor control circuit and said first circuits are ringing control circuits.

10. A bus monitor circuit for detecting malfunction of telephone circuits comprising a plurality of first terminals to be connected to respective telephone circuits for receipt of respective electrical signals from said telephone circuits during operation thereof and a plurality of second terminals, first relay means operative in response to a predetermined electrical potential, second relay means normally connecting said plurality of first terminals to corresponding ones of said plurality of second terminals and operative to switch said first terminals to a connection in common to said first relay means so that said first relay means may receive an electrical signal at said predetermined electrical potential from one of said telephone circuits, third relay means responsive to a timing signal indicating abnormal operation of a telephone circuit for operating said second relay means, and control means responsive to operation of said first relay means for producing an output signal.

11. A bus monitor circuit as defined in claim 10 wherein said control means includes a series circuit having contacts of said first and second relay means connected to said second relay means to maintain operation thereof so long as said first relay means remains operated.

12. A bus monitor circuit as defined in claim 10 wherein said control means includes means for providing a visual indication so long as said output signal is being produced.

* * * * *